United States Patent
Fonken et al.

(10) Patent No.: US 12,152,881 B2
(45) Date of Patent: Nov. 26, 2024

(54) TOTAL STATION RE-SECTIONING USING TWO-DIMENSIONAL TARGETS

(71) Applicant: Trimble Inc., Westminster, CO (US)

(72) Inventors: Matthew Fonken, Federal Heights, CO (US); Ashish Dhital, Westminster, CO (US); Scott Graybill, Arvada, CO (US); Vinod Khare, Westminster, CO (US)

(73) Assignee: Trimble Inc., Westminster, CO (US)

( * ) Notice: Subject to any disclaimer, the term of this patent is extended or adjusted under 35 U.S.C. 154(b) by 70 days.

(21) Appl. No.: 17/981,373

(22) Filed: Nov. 4, 2022

(65) Prior Publication Data

US 2024/0151529 A1  May 9, 2024

(51) Int. Cl.
*G01C 15/00* (2006.01)
*G06T 7/70* (2017.01)
*H04N 23/61* (2023.01)
*H04N 23/695* (2023.01)

(52) U.S. Cl.
CPC .............. *G01C 15/002* (2013.01); *G06T 7/70* (2017.01); *H04N 23/61* (2023.01); *H04N 23/695* (2023.01); *G06T 2207/30244* (2013.01)

(58) Field of Classification Search
None
See application file for complete search history.

(56) References Cited

U.S. PATENT DOCUMENTS

| | | | |
|---|---|---|---|
| 2010/0174507 A1* | 7/2010 | Vogel | G06T 7/73 348/143 |
| 2015/0160342 A1* | 6/2015 | Zweigle | B25J 13/08 356/5.01 |
| 2017/0277953 A1* | 9/2017 | Stanley | G06V 20/176 |
| 2020/0396384 A1* | 12/2020 | Hu | H04N 23/64 |
| 2021/0398314 A1 | 12/2021 | Sivalingam et al. | |
| 2022/0011103 A1 | 1/2022 | Kahle et al. | |
| 2022/0201163 A1* | 6/2022 | Ukas-Bradley | H04N 5/272 |

FOREIGN PATENT DOCUMENTS

| | | | | |
|---|---|---|---|---|
| GB | 2605442 A | * | 10/2022 | G01C 15/002 |

OTHER PUBLICATIONS

Extended European Search Report for Application No. 23204609.4-1009, date of completion of the search Mar. 28, 2024, 9 pages.

* cited by examiner

*Primary Examiner* — Edemio Navas, Jr.
(74) *Attorney, Agent, or Firm* — Kilpatrick Townsend & Stockton LLP

(57) ABSTRACT

Two-dimensional targets, such as AprilTags, are used as control points. AprilTags can be used as cost effective alternatives to traditional prism targets without losing accuracy. AprilTags can be placed precisely around a construction site as "permanent" survey control points, like positioning reflector targets. A robotic total station, equipped with a camera sensor, can image the two-dimensional targets to efficiently resection itself.

20 Claims, 5 Drawing Sheets

TOTAL STATION RE-SECTIONING USING TWO-DIMENSIONAL TARGETS

CROSS-REFERENCE TO RELATED APPLICATIONS

The following U.S. patent applications (including this one) are being filed concurrently, and the entire disclosure of the other applications are incorporated by reference into this application for all purposes:
 application Ser. No. 17/981,373, filed Nov. 4, 2022, entitled "TOTAL STATION RE-SECTIONING USING TWO-DIMENSIONAL TARGETS";
 application Ser. No. 17/981,375, filed Nov. 4, 2022, entitled "OPTICAL MAP DATA AGGREGATION AND FEEDBACK IN A CONSTRUCTION ENVIRONMENT"; and
 application Ser. No. 17/981,377, filed Nov. 4, 2022, entitled "CONSTRUCTION LAYOUT USING ROBOTIC MARKING AND AUGMENTED REALITY METADATA OVERLAYS".

BACKGROUND

This disclosure relates in general to surveying systems. Surveying determines positions of points relative to each other and/or to the Earth. Surveying can be used in many applications by land surveyors, construction professionals, and civil engineers. Surveying often uses specialized equipment, such as laser levels, surveying rods, total stations, laser scanners, and GNSS (Global Navigation Satellite System) receivers.

BRIEF SUMMARY

This disclosure relates to re-sectioning a device within an environment. Re-sectioning can include precisely positioning a device within an environment that has previously surveying control points.

In certain embodiments, a system for positioning and orienting a device (e.g., a total station) within a construction environment comprises a surveying instrument; a first target, a second target, and/or one or more memory devices. In some embodiments, the surveying instrument comprises a camera and an electronic distance measurement (EDM) unit; the first target is a two-dimensional target; the second target is a two-dimensional target; and/or the second target is visually distinguishable from the first target. In some embodiments, the one or more memory devices comprise instructions that, when executed, cause one or more processors to perform the following steps: detecting the first target, using a camera of the surveying instrument, wherein a position and orientation of the first target with respect to the construction environment was previously measured; calculating an orientation of the first target with respect to the surveying instrument, based on an image of the first target acquired by the camera of the surveying instrument; measuring a distance from the surveying instrument to the first target, using the EDM unit of the surveying instrument; estimating a position and an orientation of the surveying instrument with respect to the construction environment based on: the orientation of the first target with respect to the surveying instrument, the distance from the surveying instrument to the first target, and/or the position and orientation of the first target with respect to the construction environment; estimating a position of the second target with respect to the surveying instrument, based on estimating the position and the orientation of the surveying instrument with respect to the construction environment, wherein a position of the second target with respect to the construction environment was previously measured; orienting the camera of the surveying instrument toward the second target, based on estimating the position of the second target with respect to the surveying instrument; acquiring an image of the second target, using the camera of the surveying instrument; identifying the second target, based on the image of the second target acquired by the camera of the surveying instrument; measuring a distance from the surveying instrument to the second target, using the EDM unit of the surveying instrument; measuring a change in orientation of the camera from the first target to the second target based on rotation of the surveying instrument; and/or revising the position and/or the orientation of the surveying instrument with respect to the construction environment based on the distance from the surveying instrument to the second target, the change in orientation measured for the camera from the first target to the second target, and/or the position of the second target with respect to the construction environment. In some embodiments, the surveying instrument is a robotic total station; the two-dimensional target has a width equal to or greater than three inches; no more than six targets are used to position the surveying instrument; and/or the first target is passive, such that the first target does not emit light.

In certain embodiments, a method for positioning and orienting a device within an environment comprises detecting a first target, using a camera of the device, wherein the first target is a two-dimensional target and a position and orientation of the first target with respect to the environment was previously measured; calculating an orientation of the first target with respect to the device, based on an image of the first target acquired by the camera of the device; measuring a distance from the device to the first target; and/or estimating a position and an orientation of the device with respect to the environment based on the orientation of the first target with respect to the device, the distance from the device to the first target; and/or the position and orientation of the first target with respect to the environment. In some embodiments, the method further comprises estimating a position of a second target with respect to the device, based on estimating the position and the orientation of the device with respect to the environment, wherein the second target is a two-dimensional target, the second target is visually distinguishable from the first target, and a position of the second target with respect to the environment was previously measured; orienting the camera of the device toward the second target, based on estimating the position of the second target with respect to the device; acquiring an image of the second target, using the camera of the device; identifying the second target, based on the image of the second target acquired by the camera of the device; measuring a distance from the device to the second target; measuring a change in orientation of the camera from the first target to the second target based on rotation of the device; revising the position and/or the orientation of the device with respect to the environment based on the distance from the device to the second target, the change in orientation measured for the camera from the first target to the second target, and the position of the second target with respect to the environment; surveying target positions before the detecting the first target; changing resolution of the camera after detecting the first target and calculating the orientation of the first target with respect to the device; and/or decoding information from the first target to verify that the first target is a control point. In some embodiments, the device is a total station; the device is a total station and scanner; measuring a distance from the total station to the first target uses an electronic distance measurement (EDM) unit of the total station; three corners of the first target are detected to calculate three degrees of rotational freedom and/or three degrees of positional freedom of the first target; the first target is detected in an image based on a machine-learning model; positions of targets with respect to the environment are saved in a remote library; and/or the first target comprises a machine-readable code and a reflective element.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

Figure 1:
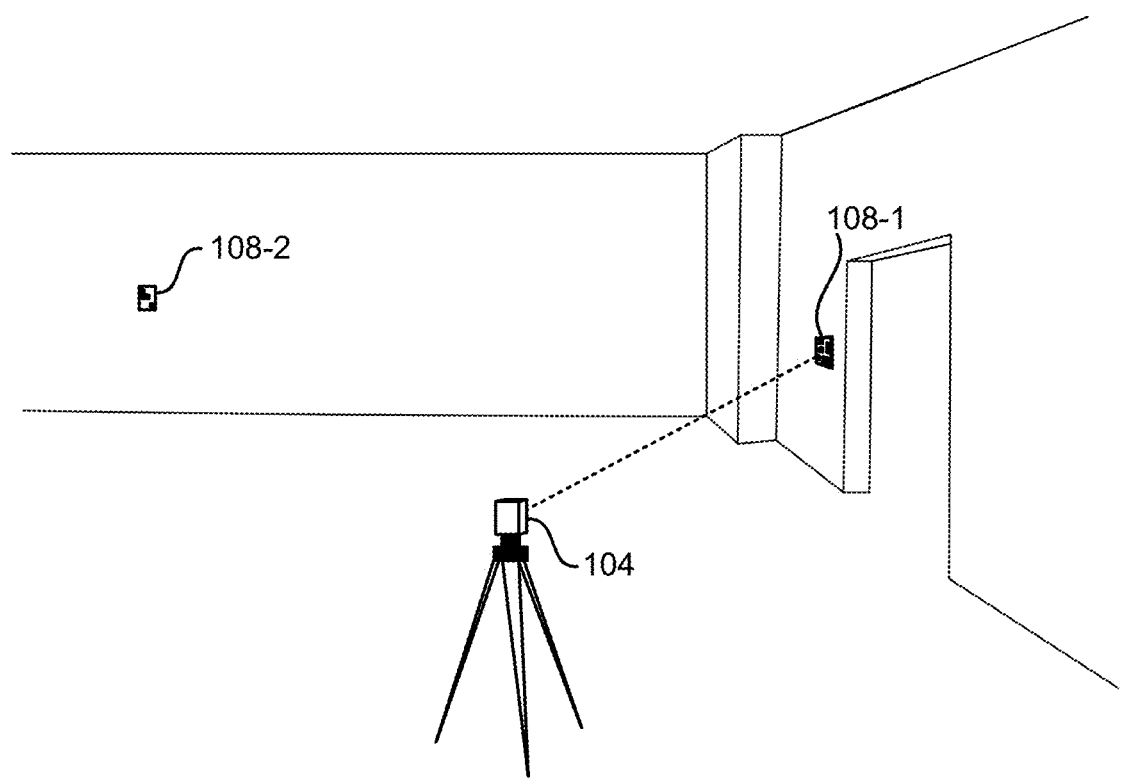
FIG. 1 depicts an embodiment of a system for positioning a total station within a construction environment.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

This disclosure relates to re-sectioning a device within an environment. Re-sectioning is a process of precisely positioning a device within an environment that has previously surveyed control points. In addition to, or in lieu of, reflector control points, two-dimensional targets, such as AprilTags, are used as control points. AprilTags can be used as cost effective alternatives to traditional prism targets without losing accuracy. AprilTags can be placed precisely around a construction site as "permanent" survey control points, like positioning reflector targets. While a reflector target typically marks a single point, an AprilTag marks multiple points together labeled as one or more control points. The positions of these AprilTags, like other survey control, are known in digital and physical coordinate systems, enabling the connection of the two worlds.

A robotic total station, equipped with a camera sensor, can scan its environment to auto-detect fixed control points around a site. Once one or more (e.g., three) control points are identified and measured, the total station will have automatically resection/stationed itself. Re-sectioning using reflector targets is possible today, but it uses a slow brute force searching method and often identifies false positives (e.g., construction vests). Re-sectioning using reflector targets can take 5-10 minutes to finish a resection and sometimes will have done it incorrectly. Accordingly, automatic re-sectioning using reflector targets is rarely used.

After the total station detects an AprilTag target, it can also read the information embedded in the AprilTag to ensure that the target is actually a control point and not a false positive. This also tells the total station exactly which control point the total station is looking at, which can assist with the detection of the subsequent targets.

Using the camera on the total station, the corners of the AprilTag can be located and thus the 6 degrees of freedom (DOF) of the control point can be calculated. Since the positional relationship between each control point is known in the digital coordinate system, this information enables the total station to make a well-informed prediction on where the subsequent targets are in relation to the first as well as orientations of targets. Subsequent targets oriented away from the camera's line of sight, such as targets that might be difficult or impossible to read, can be avoided. Thus, a brute force search method can be used for finding the first target only. In some embodiments, the total station is aimed at the first target, rather than brute search.

AprilTag detection can have advantages over traditional prism/reflector target methods in stationing. For example, a total station is often moved in building construction to deal with occlusion, especially as more of the building is fit out. AprilTag detection can speed up the process to resection the total station after it is moved. AprilTags can enable positioning other solutions, thus giving customers multiple return on investment points for the upfront time investment in setting up the control. False positives can be reduced and/or eliminated as the total station will only lock on to an AprilTag with embedded information (e.g., no longer locks on vests), which can speed up the resection process and/or provide a higher success rate. Poorly oriented targets (e.g., facing away from the camera) can be avoided as well, further speeding up the process.

After the first target has been located, an approximate station can be computed that speeds up the search for subsequent targets. Thus, the resection process can happen much faster, which adds up over the number of times resection is performed. Thus, using two-dimensional targets as control points can increase resection automation, speed, and/or reduction of false positives, improving robustness and/or decreasing time. Two-dimensional targets can provide high accuracy positioning (e.g., multi-millimeter accuracy) for construction environments.

Referring first to FIG. 1, an embodiment of a system for re-sectioning a surveying instrument, such as a robotic total station, within a construction environment is shown. The system comprises a surveying instrument 104 and a plurality of targets 108 within an environment. The environment is a location (e.g., a three-dimensional space) of interest, such as a construction site.

The surveying instrument 104 comprises a camera and a measurement system, such as an electronic distance measurement (EDM) unit. In some embodiments, the surveying instrument 104 is a scanner, such as a laser scanner.

The targets 108 are two-dimensional targets, such as AprilTags. The targets 108 are visually distinguishable from each other (e.g., each target 108 is unique). The targets 108 were surveyed previously, and three degrees of position and three degrees of orientation (e.g., referred to combined as 6 degrees of freedom or 6 DOF) are known with respect to the environment. For example, 6-DOF information of targets 108 is saved in a remote database (e.g., remote from the surveying instrument 104). The remote database is sometimes referred to as a remote library. The remote library can be stored in a memory device within the environment (e.g., on a mobile device of the user) and/or in a memory device outside the environment (e.g., on a server in the cloud).

FIG. 1 depicts a first target 108-1 and a second target 108-2. Though only two targets 108 are shown, more than two targets 108 can be used. In some embodiments, only one target 108 is used.

The camera of the surveying instrument 104 is used to detect the first target 108-1. For example, the camera acquires a plurality of images from a video feed, and a machine learning algorithm is run on one or more of the plurality of images. A position and an orientation of the first target 108-1 (and other targets 108) with respect to the environment was previously measured.

An orientation of the first target 108-1 with respect to the surveying instrument 104 is calculated, based on an image of the first target 108-1 acquired by the camera of the surveying instrument 104. For example, corners of the first target 108-1 are identified and positions of the corners within the image are used to calculate an orientation of the first target 108-1 (e.g., using known dimensions of the first target).

A distance from the surveying instrument 104 to the first target 108-1 is measured. For example, an EDM unit of the surveying instrument is used to measure a distance from the surveying instrument 104 to the first target 108-1.

A position and an orientation of the surveying instrument 104 with respect to the environment is estimated based on: (i) the orientation of the first target 108-1 with respect to the surveying instrument 104; (ii) the distance from the surveying instrument 104 to the first target 108-1; and (iii) the known position and orientation of the first target 108-1 with respect to the environment.

Figure 2:
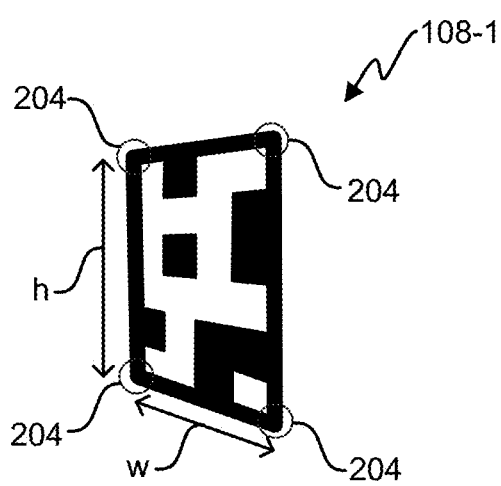
FIG. 2 depicts an embodiment of a target.

FIG. 2 depicts an embodiment of a target. The embodiment shown in FIG. 2 is of the first target 108-1 from FIG. 1. The target 108 is a two-dimensional target having a height h and a width w. The target 108 is passive, such that the target 108 does not emit light. In some embodiments, the target 108 comprises a machine-readable code, such as a one- or two-dimensional barcode. For example, the target 108 could be an AprilTag, QR code, or barcode. In some embodiments, an AprilTag is used because an AprilTag is relatively easy to scale (e.g., made larger or smaller depending on the application, such as a distance of a camera from the target and/or a resolution of the camera). In some embodiments, the height h and/or the width w are equal to or greater than 3, 4, 5, 6, 12, or 18 inches and/or equal to or less than 36, 24, 12, or 8 inches. In some embodiments, the code is decoded to verify that the target is a control point and/or to identify which control point the target is. In some embodiments, a hybrid target (e.g., AprilTag+flat cateye or foil) is used. In some situations, combining a reflective element (e.g., reflector, foil, and/or flat cateye) and a two-dimensional pattern (e.g., a machine-readable code; AprilTag) can give a more robust target with benefits from both.

In some embodiments, a resolution of the camera of the surveying instrument is changed after detecting a target 108. For example, the camera uses images from a video feed to detect a target 108 in a field of view of the camera. After a target 108 is detected in an image of the video feed, a first image, the camera changes to a photography mode and acquires a second image, wherein the second image is acquired using higher resolution than the first image. The second image is used to calculate an orientation of the target with respect to the camera of the surveying instrument. In some embodiments, three or more corners 204 of the target 108 are used to calculate three degrees of rotational freedom (e.g., yaw, pitch, roll) of the first target with respect to the camera of the surveying instrument (e.g., using a homography transformation based on a known size and/or shape of the target).

In some embodiments, the second image (the higher-resolution image) is used to point the EDM of the surveying system. For example, the EDM is pointed to one or more corners 204 of the target, using higher-resolution image(s). The EDM is used to measure a position of at least one of the corners 204 of the target 108 (or other location of the target 108, such as the center), to provide three degrees of translational freedom (e.g., x, y, z) of the target 108 with respect to the surveying instrument.

Figure 3:
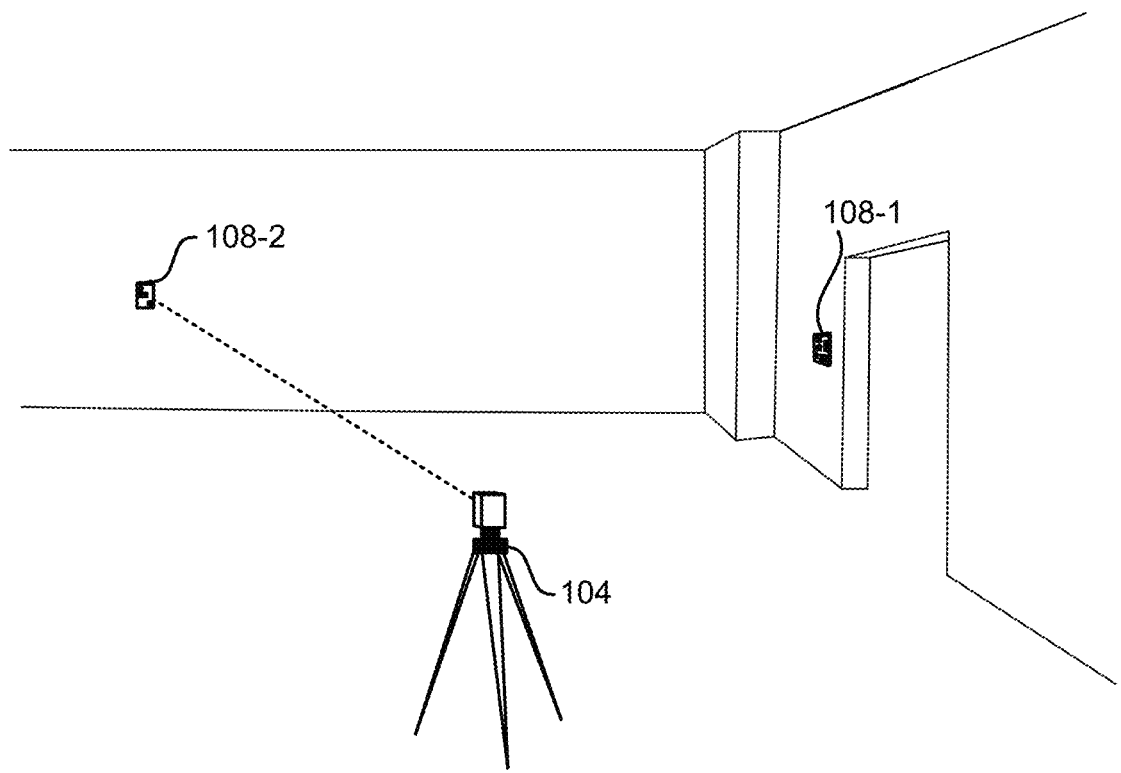
FIG. 3 depicts an embodiment of a system measuring a second target.

FIG. 3 depicts an embodiment of the surveying instrument 104 measuring a second target 108-2. After estimated a position and orientation of the surveying instrument 104 with respect to the environment, based on the position and orientation of the first target 108-1 with respect to the surveying instrument 104 and the known position and orientation of the first target 108-1 with respect to the environment target, a position of the second target with respect to the surveying instrument 104 can be estimated. For example, the position of the second target 108-2 with respect to the environment was previously measured and is retrieved from a library (e.g., a database) of target positions and/or orientations.

The surveying instrument 104 can automatically rotate and point the camera and/or EDM toward the estimated location of the second target 108-2, based on calculating the estimated position of the second target 108-2 with respect to the surveying instrument 104. Automatically rotating the camera and/or EDM toward the second target 108-2 orients the camera and/or the EDM of the surveying instrument 104 toward the second target 108-2. Automatically pointing the camera and/or the EDM toward the second target 108-2 can save time because the surveying instrument 104 does not have to scan (e.g., using a brute force searching method) to search for the second target 108-2.

After the camera of the surveying instrument 104 is oriented toward the estimated position of the second target 108-2, the camera acquires an image of the second target 108-2. The second target 108-2 is identified in the image acquired by the camera of the second target 108-2. For example, AI or optical recognition is used to identify the second target 108-2 in the image. In some embodiments, multiple images of the second target 108-2 are acquired (e.g., a lower-resolution image from a video feed and a higher-resolution image from a photography mode). A distance from the surveying instrument 104 to the second target 108-2 is measured, using the EDM unit of the surveying instrument 104. For example, a low-resolution or high-resolution image is used to point the EDM at a specific part (e.g., a corner, center, or other feature) of the second target 108-2. A change in orientation of the surveying instrument 104 (e.g., by measuring a change in orientation of the camera of the surveying instrument 104) from the first target 108-1 to the second target 108-2 is measured based on rotation of the surveying instrument 104. For example, the surveying instrument 104 comprises angle encoders that measure rotation of the surveying instrument.

The position and/or the orientation of the surveying instrument 104 with respect to the environment is revised, based on: the distance from the surveying instrument 104 to the second target 108-2; the measured change in orientation of the camera from the first target 108-1 to the second target 108-2; and/or the position of the second target 108-2 with respect to the environment, wherein the position of the second target 108-2 with respect to the environment was previously measured. In some embodiments, the orientation of the second target 108-2 with respect to the surveying instrument 104 is also calculated and used to revise the position and/or the orientation of the surveying instrument with respect to the environment. However, the applicant has found that simply measuring the position of the second target 108-2 with respect to the surveying instrument 104 is a good compromise between speed and accuracy in updating the position and the orientation of the surveying instrument 104. In some embodiments, a machine-readable code of the second target 108-2 is decoded to confirm the second target 108-2 is actually the second target 108-2.

Additional targets 108, at different positions, can be measured with respect to the surveying instrument 104, to further refine the accuracy of the position and/or orientation of the surveying instrument 104 with respect to the environment. In some embodiments, at least 1, 2, or 3 targets 108 are used in calculating the position of the surveying instrument 104 with respect to the environment. In some embodiments, no more than 1, 2, 3, 5, 6, or 10 targets are used in calculating the position of the surveying instrument 104 with respect to the environment. By using fewer targets, setup of targets 108 and/or re-sectioning can be performed more efficiently and/or quickly. In some embodiments, a subset of targets is selected from a database to increase precision (e.g., the second target is at least 45, 70, or 90 degrees rotation from the first target).

Figure 4:
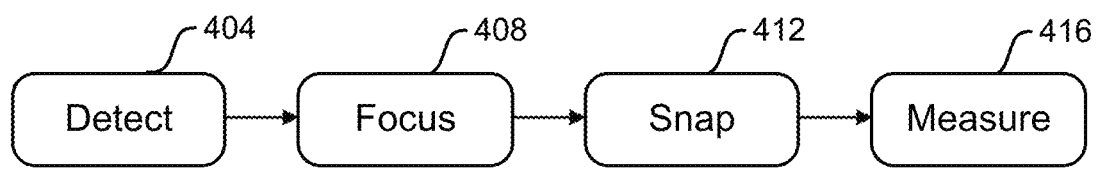
FIG. 4 is a simplified flowchart of an embodiment of a detection process.

FIG. 4 is a simplified flowchart of an embodiment of a detection process. In some embodiments AprilTags are used. Accurate AprilTag detection technology can enable a user to accurately detect AprilTags in an environment by using machine learning, computer vision, and/or EDM data.

AprilTags are two-dimensional targets designed to be quickly and accurately detected. They can be printed in various sizes (scalable); the corners can be detected by a camera to determine their six degrees of freedom; they contain x-bits of information, smaller than a QR code; and their simplicity enables their rapid detection. Accurate AprilTag detection technology can provide an accurate and/or cheaper alternative to measuring survey targets.

In some embodiments, accurate AprilTag detection comprises: a machine learning based object detection to coarsely detect the AprilTag in an image; a computer-vision algorithm to detect the four corners of the AprilTag; and/or an using an EDM device that provides intermediate measurements to hone in the precise corner. On a high level, the image from a robotic total station/scanner is fed into an AprilTag library. If there is an AprilTag in the frame, it is detected by a TensorFlow Object detection algorithm. A bounding box (x, y, width, height) of the detection is passed to a Computer Vision (CV) module. The CV module uses the detection plus EDM data to accurately detect lines of the AprilTag and then take a measurement of one of the four corners of the AprilTag. The measurement is then passed to a client application for usage with various use cases, such as re-sectioning.

Accurate AprilTag detection can include a combination of machine learning and computer-vision algorithms, and optionally with EDM measurement data, to calculate accurate position of AprilTags. Corner detection can be accomplished by finding the four edges of the tag using a Hough transformation and then finding an intersections lines. This can be done multiple times with a range of parameters to handle wide variations in lighting and distance.

An automatic resolution adjustment can be used to handle high-data streams. Machine learning can quickly estimate tags with minimal resolution. When found, boost resolution and crop out region-of-interest that is full resolution but a fraction the size of the full image. Calculation of six degrees of freedom (6 DOF) and rough station estimation from a single AprilTag target can be performed. There can be flexibility in using different components of a library.

Though an AprilTag represents a visually readable fiducial (e.g., as a fiducial marker), other types of two-dimension patterns can be used. For example, an AR Tag, ARUco, QR code, barcode, artistic design, and/or a ruler could be used. In some embodiments, the target is black and white, for contrast. In some embodiments, specific colors are used (e.g., for contrast and/or colors that might be rare in the environment).

In some embodiments, a process for re-sectioning includes: 1. Setup, 2. Station, and 3. Measure.

1. Setup. A number of targets n are placed at a blank jobsite. In some embodiments, n is equal to or greater than 1, 2, 3, 5, or 10 and equal to or less than 20, 15, 10, 6, 3, or 1. The targets are surveyed with respect to the environment. For example, a total station is precisely positioned and surveys the targets by pointing the total station at each target. The position and orientation of each target is saved to a library. In some embodiments, the total station is moved to be in line of sight and to survey additional targets.

2. Station. To resection a total station (or other device), the total station is set up in view of two or more pre-surveyed targets. For example, the total station in 1. Setup was moved around a jobsite and is being repositioned. A user starts a one-click routine. The one-click routine causes the total station to rotate until a target enters a frame. The target is measured and 6 DOF of the total station is estimated. Angles of other targets are calculated and ordered. The total station turns (e.g., automatically because positions of targets are known) to the next target and measures the next target. Turning the total station and measuring another target is repeated until each target is measured, or until the system ascertains that position and/or orientation of the total station is within a given error tolerance. In some embodiments, the position and/or orientation of the total station is calculated after each target is measured and/or after all targets are measured.

3. Measure. To measure a target, machine-learning detection is enabled. Lower resolution of the camera can be used to avoid dropped frames. For example, frames of a video stream are analyzed using a machine-learning algorithm to detect a target in an image frame. On a viable detection, step 404 (e.g., high confidence and/or m number of repeats), a list of each target in a frame can be made. The camera is turned toward and focused on a target (step 408) that was detected. A resolution of the camera can be adjusted (e.g., to maximum resolution), and one or more images of the target are acquired (snap, step 412) for processing. Processing can include crop out and/or resize a region of interest around detection across multiple frames; de-artifact and/or boost dynamic range; blur, deblur, and/or detect edges; detection to find edge lines (e.g., using a Hough transformation); extrapolate lines to find three or four corners; decode the target (e.g., decode the AprilTag); and/or repeat with heavier blur to account for higher detail images or closer targets. Corners of the target are measured using image analysis and/or an EDM to calculate a position and orientation of the total station with respect to the target, step 416. A position and orientation of the total station is estimated based on measuring the position and orientation of the total station with respect to the target and the known orientation of the target with respect to the environment. The total station can then rotate (e.g., automatically) to point at the next target, and the next target is detected, focused on, snapped, and measured.

Though techniques describe using a total station with an EDM, techniques described herein can be used in many applications. For example, a total station can be positioned, and/or re-sectioning can be performed, without using an EDM (e.g., measuring distance to corners of targets using image analysis and known size of targets). Below are further examples of applications for using accurate AprilTag detection.

A. Robotics and Scanner. Accurate AprilTag Detection technology can be used with the Trimble X7 scanner and/or Spot robot system. AprilTag targets scattered around the construction site can be accurately detected by the scanner and then used to position the Spot robot in the world coordinate system. Each AprilTag can also be identified independently.

B. Arm and machinery tracking. AprilTag detection can be used detecting and positioning arms or other parts of heavy machinery. The high speed at which tags can be detected visually make them viable for tracking moving objects. In some embodiments, AprilTags are detected and 3+ points used to calculate pose. On movement, the total station moves (e.g., continuously) to lock onto one or more anchor points. On stop, remeasure 3+ points to update pose, and then repeat. This method regularly, consistently, and/or continuously provides 6 DOF at all times (robust when stationary and good estimate when moving).

C. Crack/fault monitoring. Permanent tags can be fastened near structural cracks or faults for monitoring. The flatness and 6 DOF accuracy of tags provides unique information compared to reflective targets.

Figure 5:
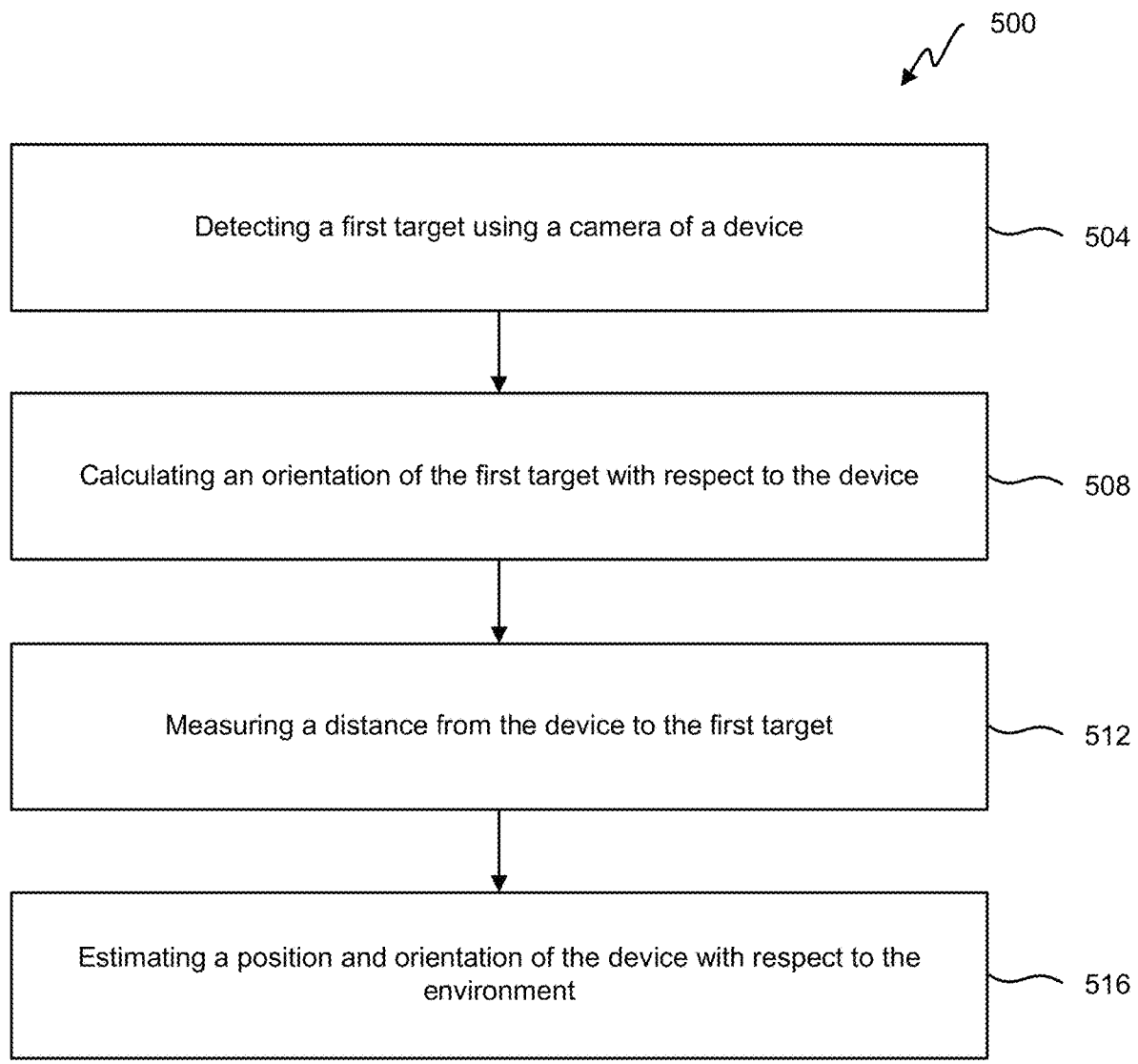
FIG. 5 illustrates a flowchart of an embodiment of a process for a rough alignment of a surveying instrument with an environment.

FIG. 5 illustrates a flowchart of an embodiment of a process 500 for a rough alignment of a device (e.g., a surveying instrument) within an environment. Process 500 begins in step 504 with detecting a first target. The first target can be detected using a camera of the device (e.g., analyzing images from a video feed of the camera). The first target is a two-dimensional target. The position and orientation of the first target is known with respect to the environment (e.g., the position and orientation of the first target was previously measured/surveyed). For example, the first target is the first target 108-1 in FIG. 1.

In step 508, an orientation of the first target with respect to the device is calculated, based on an image of the first target acquired by the camera of the device. For example, a high-resolution image of the target is acquired by the camera, and a homography of the first target with respect to a flat view of the first target is calculated.

In step 512, a distance from the device to the first target is measured. For example, an EDM of the device is used to measure a distance from the device to the first target. In some embodiments, distances to more than one part of the first target are measured. For example, distances to three or four corners of the first target are measured using the EDM. In some embodiments, a distance from the device to the first target is measured using an image of the first target (e.g., the same image used to calculate the orientation) and a known dimension of the first target. For example, if the height of the first target is known, a distance from the camera to the first device can be calculated using the height of the target for scale. Applicant has found that using an EDM can provide more accurate results than measuring the distance using an image, in some situations.

In step 516, a position and/or orientation of the device with respect to the environment is estimated. The position and/or orientation estimation is based on the orientation of the first target with respect to the device; the distance from the device to the first target; and/or the position and orientation of the first target with respect to the environment. In some embodiments, the method comprises surveying target positions, before detecting the first target.

Figure 6:
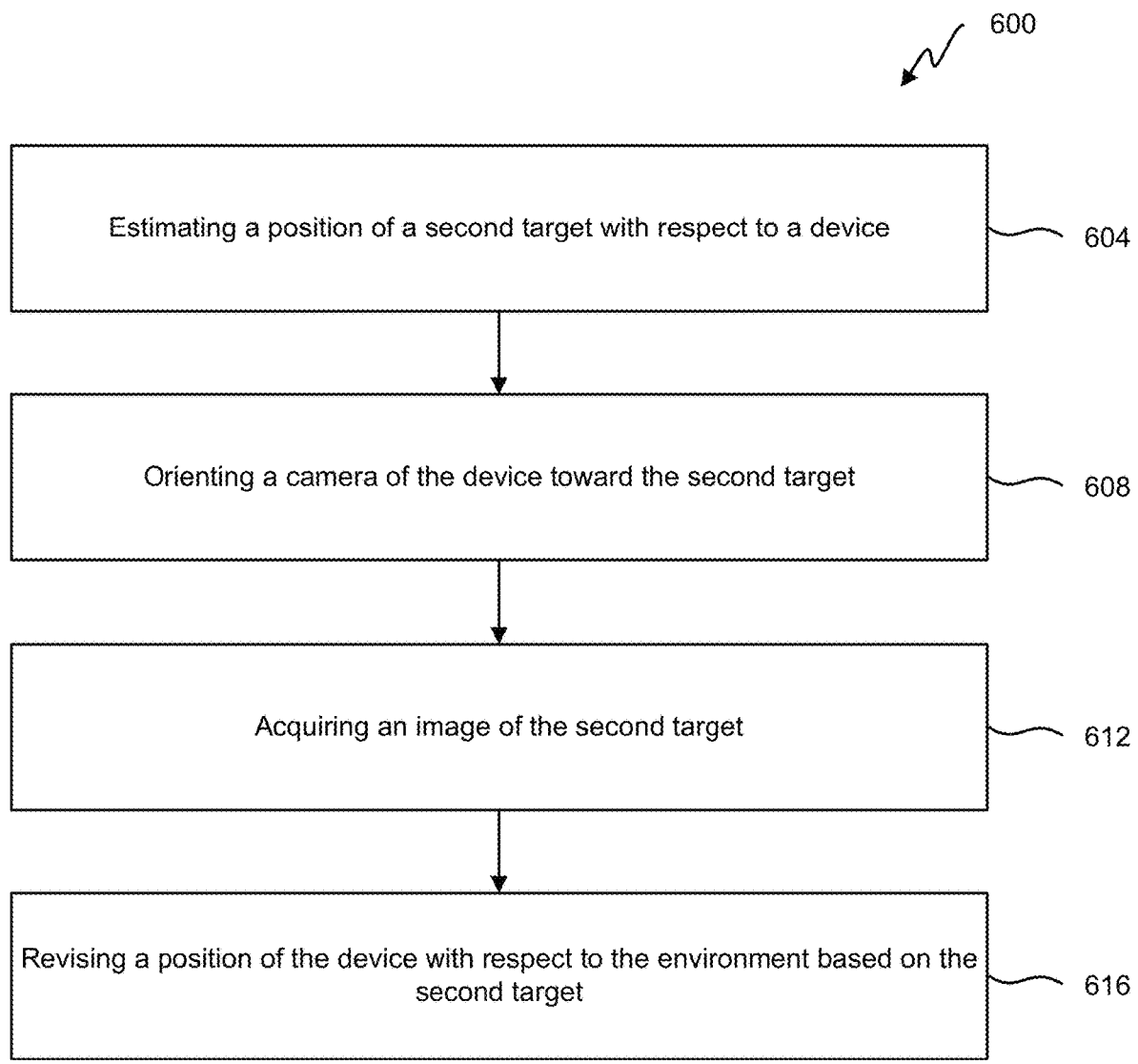
FIG. 6 illustrates a flowchart of an embodiment of a process for a refined alignment of the surveying instrument with the environment.

FIG. 6 illustrates a flowchart of an embodiment of a process 600 for a refined alignment of the surveying instrument with the environment. Process 600 begins in step 604 with estimating a position of a second target with respect to a device, based on an estimated position and orientation of the device with respect to the environment. For example, step 604 occurs after step 516 in FIG. 5.

The second target is a two-dimensional target. The second target is visually distinguishable from the first target. For example, the second target is the second target 108-2 in FIG. 1. A position of the second target with respect to the environment was previously measured. The system can access a database or file that has the position of the second target with respect to the environment and can calculate the position of the second target with respect to the device based on the estimate of the device with respect to the environment.

In step 608, the camera of the device is oriented toward the second target, based on estimating the position of the second target with respect to the device. For example, the camera of a total station is oriented (e.g., automatically) toward the second target since the position of the target with respect to the environment is known.

In step 612, an image of the second target is acquired, using the camera of the device. For example, the camera of the total station takes a picture of the second target 108-2 in FIG. 1. In some embodiments, the second target is identified, based on the image of the second target acquired by the camera of the device (e.g., the second target is decoded).

In step 616, a position of the device with respect to the environment is revised, based on the second target. Revising the position and/or orientation of the device with respect to the environment can be based on the distance from the device to the second target; the measured change in orientation for the camera from the first target to the second target; and/or the position of the second target with respect to the environment.

In some embodiments, the method comprises measuring a distance from the device to the second target (e.g., using an EDM of the total station), and the position of the second target with respect to the device is calculated using the distance measured. In some embodiments, a change in orientation of the camera from the first target to the second target is measured based on rotation of the device. For example, the total station measures rotation (e.g., using angle encoders) as the total station moves the camera from aiming at the first target to aim at the second target. Process 600 can be repeated for additional targets to further refine the position of the device.

Figure 7:
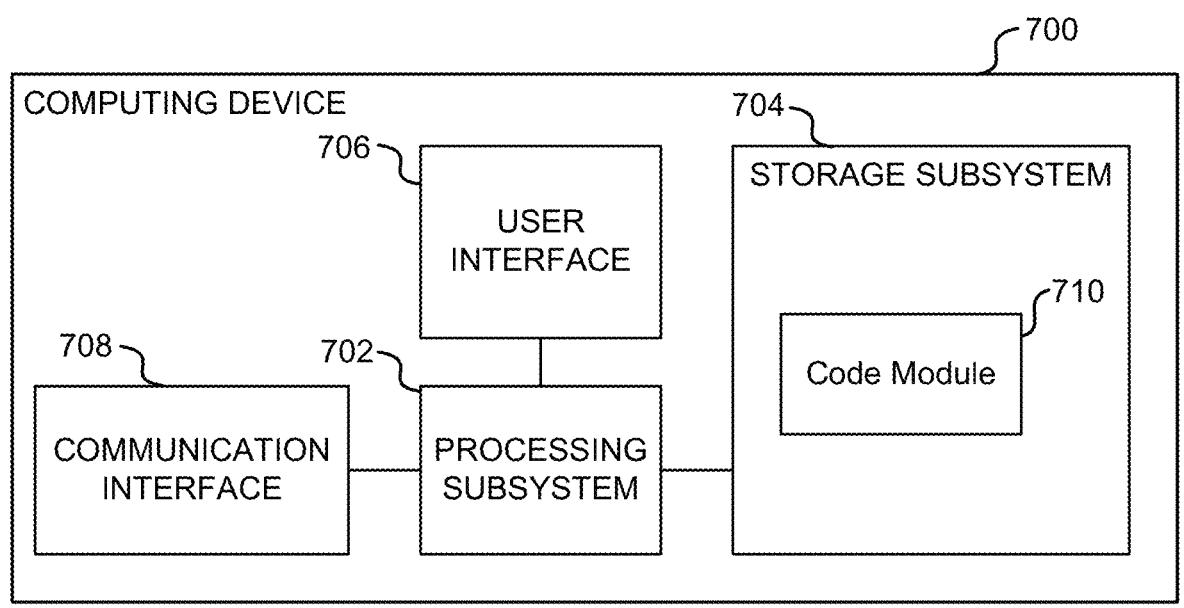
FIG. 7 depicts a block diagram of an embodiment of a computer system.

FIG. 7 is a simplified block diagram of a computing device 700. Computing device 700 can implement some or all functions, behaviors, and/or capabilities described above that would use electronic storage or processing, as well as other functions, behaviors, or capabilities not expressly described. Computing device 700 includes a processing subsystem 702, a storage subsystem 704, a user interface 706, and/or a communication interface 708. Computing device 700 can also include other components (not explicitly shown) such as a battery, power controllers, and other components operable to provide various enhanced capabilities. In various embodiments, computing device 700 can be implemented in a desktop or laptop computer, mobile device (e.g., tablet computer, smart phone, mobile phone), wearable device, media device, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function or combination of functions described above.

Storage subsystem 704 can be implemented using a local storage and/or removable storage medium, e.g., using disk, flash memory (e.g., secure digital card, universal serial bus flash drive), or any other non-transitory storage medium, or a combination of media, and can include volatile and/or non-volatile storage media. Local storage can include random access memory (RAM), including dynamic RAM (DRAM), static RAM (SRAM), or battery backed up RAM. In some embodiments, storage subsystem 704 can store one or more applications and/or operating system programs to be executed by processing subsystem 702, including programs to implement some or all operations described above that would be performed using a computer. For example, storage subsystem 704 can store one or more code modules 710 for implementing one or more method steps described above.

A firmware and/or software implementation may be implemented with modules (e.g., procedures, functions, and so on). A machine-readable medium tangibly embodying instructions may be used in implementing methodologies described herein. Code modules 710 (e.g., instructions stored in memory) may be implemented within a processor or external to the processor. As used herein, the term "memory" refers to a type of long term, short term, volatile, nonvolatile, or other storage medium and is not to be limited to any particular type of memory or number of memories or type of media upon which memory is stored.

Moreover, the term "storage medium" or "storage device" may represent one or more memories for storing data, including read only memory (ROM), RAM, magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine readable medium such as a storage medium. A code segment (e.g., code module 710) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc., may be passed, forwarded, or transmitted by suitable means including memory sharing, message passing, token passing, network transmission, etc.

Implementation of the techniques, blocks, steps and means described above may be done in various ways. For example, these techniques, blocks, steps and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module 710 may comprise sets of instructions (codes) embodied on a computer-readable medium that directs a processor of a computing device 700 to perform corresponding actions. The instructions may be configured to run in sequential order, in parallel (such as under different processing threads), or in a combination thereof. After loading a code module 710 on a general purpose computer system, the general purpose computer is transformed into a special purpose computer system.

Computer programs incorporating various features described herein (e.g., in one or more code modules 710) may be encoded and stored on various computer readable storage media. Computer readable media encoded with the program code may be packaged with a compatible electronic device, or the program code may be provided separately from electronic devices (e.g., via Internet download or as a separately packaged computer-readable storage medium). Storage subsystem 704 can also store information useful for establishing network connections using the communication interface 708.

User interface 706 can include input devices (e.g., touch pad, touch screen, scroll wheel, click wheel, dial, button, switch, keypad, microphone, etc.), as well as output devices (e.g., video screen, indicator lights, speakers, headphone jacks, virtual- or augmented-reality display, etc.), together with supporting electronics (e.g., digital-to-analog or analog-to-digital converters, signal processors, etc.). A user can operate input devices of user interface 706 to invoke the functionality of computing device 700 and can view and/or hear output from computing device 700 via output devices of user interface 706. For some embodiments, the user interface 706 might not be present (e.g., for a process using an ASIC).

Processing subsystem 702 can be implemented as one or more processors (e.g., integrated circuits, one or more single-core or multi-core microprocessors, microcontrollers, central processing unit, graphics processing unit, etc.). In operation, processing subsystem 702 can control the operation of computing device 700. In some embodiments, processing subsystem 702 can execute a variety of programs in response to program code and can maintain multiple concurrently executing programs or processes. At a given time, some or all of a program code to be executed can reside in processing subsystem 702 and/or in storage media, such as storage subsystem 704. Through programming, processing subsystem 702 can provide various functionality for computing device 700. Processing subsystem 702 can also execute other programs to control other functions of computing device 700, including programs that may be stored in storage subsystem 704.

Communication interface 708 can provide voice and/or data communication capability for computing device 700. In some embodiments, communication interface 708 can include radio frequency (RF) transceiver components for accessing wireless data networks (e.g., Wi-Fi network; 3G, 4G/LTE; etc.), mobile communication technologies, components for short-range wireless communication (e.g., using Bluetooth communication standards, NFC, etc.), other components, or combinations of technologies. In some embodiments, communication interface 708 can provide wired connectivity (e.g., universal serial bus, Ethernet, universal asynchronous receiver/transmitter, etc.) in addition to, or in lieu of, a wireless interface. Communication interface 708 can be implemented using a combination of hardware (e.g., driver circuits, antennas, modulators/demodulators, encoders/decoders, and other analog and/or digital signal processing circuits) and software components. In some embodiments, communication interface 708 can support multiple communication channels concurrently. In some embodiments, the communication interface 708 is not used.

It will be appreciated that computing device 700 is illustrative and that variations and modifications are possible. A computing device can have various functionality not specifically described (e.g., voice communication via cellular telephone networks) and can include components appropriate to such functionality.

Further, while the computing device 700 is described with reference to particular blocks, it is to be understood that these blocks are defined for convenience of description and are not intended to imply a particular physical arrangement of component parts. For example, the processing subsystem 702, the storage subsystem 704, the user interface 706, and/or the communication interface 708 can be in one device or distributed among multiple devices.

Further, the blocks need not correspond to physically distinct components. Blocks can be configured to perform various operations, e.g., by programming a processor or providing appropriate control circuitry, and various blocks might or might not be reconfigurable depending on how an initial configuration is obtained. Embodiments of the present invention can be realized in a variety of apparatus including electronic devices implemented using a combination of circuitry and software. Electronic devices described herein can be implemented using computing device 700.

Various features described herein, e.g., methods, apparatus, computer-readable media and the like, can be realized using a combination of dedicated components, programmable processors, and/or other programmable devices. Processes described herein can be implemented on the same processor or different processors. Where components are described as being configured to perform certain operations, such configuration can be accomplished, e.g., by designing electronic circuits to perform the operation, by programming programmable electronic circuits (such as microprocessors) to perform the operation, or a combination thereof. Further, while the embodiments described above may make reference to specific hardware and software components, those skilled in the art will appreciate that different combinations of hardware and/or software components may also be used and that particular operations described as being implemented in hardware might be implemented in software or vice versa.

Specific details are given in the above description to provide an understanding of the embodiments. However, it is understood that the embodiments may be practiced without these specific details. In some instances, well-known circuits, processes, algorithms, structures, and techniques may be shown without unnecessary detail in order to avoid obscuring the embodiments.

While the principles of the disclosure have been described above in connection with specific apparatus and methods, it is to be understood that this description is made only by way of example and not as limitation on the scope of the disclosure. Embodiments were chosen and described in order to explain the principles of the invention and practical applications to enable others skilled in the art to utilize the invention in various embodiments and with various modifications, as are suited to a particular use contemplated. It will be appreciated that the description is intended to cover modifications and equivalents.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

A recitation of "a", "an", or "the" is intended to mean "one or more" unless specifically indicated to the contrary. Patents, patent applications, publications, and descriptions mentioned here are incorporated by reference in their entirety for all purposes. None is admitted to be prior art.

What is claimed is:

1. A system for positioning and orienting a total station within a construction environment, the system comprising:
   a surveying instrument, the surveying instrument comprising a camera, an electronic theodolite, and an electronic distance measurement (EDM) unit;
   a first target, wherein the first target is a two-dimensional target;
   a second target, wherein:
      the second target is a two-dimensional target; and
      the second target is visually distinguishable from the first target; and
   one or more memory devices comprising instructions that, when executed, cause one or more processors to perform the following steps:
   detecting the first target, using the camera of the surveying instrument, wherein a position and orientation of the first target with respect to the construction environment was previously measured;
   calculating an orientation of the first target with respect to the surveying instrument, based on an image of the first target acquired by the camera of the surveying instrument;
   measuring a distance from the surveying instrument to the first target, using the electronic theodolite and EDM unit of the surveying instrument;
   estimating a position and an orientation of the surveying instrument with respect to the construction environment based on:

the orientation of the first target with respect to the surveying instrument;
the distance from the surveying instrument to the first target; and
the position and orientation of the first target with respect to the construction environment;
estimating a position of the second target with respect to the surveying instrument, based on estimating the position and the orientation of the surveying instrument with respect to the construction environment, wherein a position of the second target with respect to the construction environment was previously measured;
orienting the camera of the surveying instrument toward the second target, based on estimating the position of the second target with respect to the surveying instrument;
acquiring an image of the second target, using the camera of the surveying instrument;
identifying the second target, based on the image of the second target acquired by the camera of the surveying instrument;
measuring a distance from the surveying instrument to the second target, using the EDM unit of the surveying instrument;
measuring a change in orientation of the camera from the first target to the second target based on rotation of the surveying instrument; and
revising the position and/or the orientation of the surveying instrument with respect to the construction environment based on:
the distance from the surveying instrument to the second target;
the change in orientation measured for the camera from the first target to the second target; and
the position of the second target with respect to the construction environment.

2. The system of claim 1, wherein the surveying instrument is a total station or scanner.

3. The system of claim 1, wherein the two-dimensional target has a width equal to or greater than three inches.

4. The system of claim 1, wherein no more than six targets are used to position the surveying instrument.

5. The system of claim 1, wherein the first target is passive, such that the first target does not emit light.

6. A method for positioning and orienting a device within an environment, the method comprising:
detecting a first target, using a camera of the device, wherein:
the first target is a two-dimensional target; and
a position and orientation of the first target with respect to the environment was previously measured;
calculating an orientation of the first target with respect to the device, based on an image of the first target acquired by the camera of the device;
measuring a distance from the device to the first target, wherein the device comprises an electronic theodolite and an electronic distance measurement (EDM) unit for measuring the distance from the device to the first target; and
estimating a position and an orientation of the device with respect to the environment based on:
the orientation of the first target with respect to the device;
the distance from the device to the first target; and
the position and orientation of the first target with respect to the environment.

7. The method of claim 6, further comprising:
estimating a position of a second target with respect to the device, based on estimating the position and the orientation of the device with respect to the environment, wherein:
the second target is a two-dimensional target;
the second target is visually distinguishable from the first target; and
a position of the second target with respect to the environment was previously measured;
orienting the camera of the device toward the second target, based on estimating the position of the second target with respect to the device;
acquiring an image of the second target, using the camera of the device; and
identifying the second target, based on the image of the second target acquired by the camera of the device.

8. The method of claim 7, further comprising measuring a distance from the device to the second target.

9. The method of claim 8, further comprising measuring a change in orientation of the camera from the first target to the second target based on rotation of the device.

10. The method of claim 9, further comprising revising the position and/or the orientation of the device with respect to the environment based on:
the distance from the device to the second target;
the change in orientation measured for the camera from the first target to the second target; and
the position of the second target with respect to the environment.

11. The method of claim 6, wherein the device is a total station or scanner.

12. The method of claim 11, wherein no more than six targets are used to position the device.

13. The method of claim 6, further comprising surveying target positions before detecting the first target.

14. The method of claim 6, further comprising changing resolution of the camera after detecting the first target and calculating the orientation of the first target with respect to the device.

15. The method of claim 6, further comprising decoding information from the first target to verify that the first target is a control point.

16. The method of claim 6, wherein three corners of the first target are detected to calculate three degrees of rotational freedom and three degrees of positional freedom of the first target.

17. A memory device comprising instructions that, when executed, cause one or more processors to perform the following steps for positioning and orienting a device within an environment:
detecting a first target, using a camera of the device, wherein:
the first target is a two-dimensional target; and
a position and orientation of the first target with respect to the environment was previously measured;
calculating an orientation of the first target with respect to the device, based on an image of the first target acquired by the camera of the device;
measuring a distance from the device to the first target, wherein the device comprises an electronic theodolite and an electronic distance measurement (EDM) unit for measuring the distance from the device to the first target; and
estimating a position and an orientation of the device with respect to the environment based on:
the orientation of the first target with respect to the device;
the distance from the device to the first target; and the position and orientation of the first target with respect to the environment.

18. The memory device of claim 17 wherein the instructions, when executed, cause the one or more processors to perform the following step: detect the first target in an image based on a machine-learning model.

19. The memory device of claim 17 wherein positions of targets with respect to the environment are saved in a remote library.

20. The memory device of claim 17 wherein the first target comprises a machine-readable code and/or a reflective element.

* * * * *